United States Patent [19]

Babbitt et al.

[11] Patent Number: 4,650,226
[45] Date of Patent: Mar. 17, 1987

[54] HOLDDOWN SCREW

[75] Inventors: Brett A. Babbitt, Katy; Tri C. Le, Missouri City, both of Tex.

[73] Assignee: Joy Manufacturing Company, Pittsburgh, Pa.

[21] Appl. No.: 845,912

[22] Filed: Mar. 31, 1986

[51] Int. Cl.$^4$ ............................................... F16L 19/00
[52] U.S. Cl. ..................................... 285/348; 285/145; 285/141
[58] Field of Search ............... 285/348, 351, 145, 146, 285/144, 141, 139

[56] References Cited

U.S. PATENT DOCUMENTS

| | | | |
|---|---|---|---|
| 2,157,496 | 5/1939 | Penick et al. | 285/141 |
| 2,254,752 | 9/1941 | Penick et al. | 285/141 |
| 2,542,302 | 2/1951 | Barker | 285/145 |
| 2,775,472 | 12/1956 | Brown | 285/348 X |
| 3,679,238 | 7/1972 | Putch | 285/144 |
| 4,554,971 | 11/1985 | Cobb | 485/145 X |

Primary Examiner—Richard J. Scanlan, Jr.
Attorney, Agent, or Firm—Marvin J. Marnock

[57] ABSTRACT

A holddown screw 10 which features a shank 23 and contact nose 22 of separate construction. The contact nose 22 is provided with a flat bevelled contact surface 32 of predetermined angle to the axis of the screw selected to correspond to the angle of the camming surface 17a with which it is designed to cooperate. The contact nose is carried on the shank 23 and is adapted for relative rotation thereon as the screw is rotated. The back end of the contact nose is provided with an annular surface 22a disposed radially to the longitudinal axis of the screw and adapted to engage an annular shoulder 35 of the shank 23 in flat co-planar relationship therewith. As the screw is rotated and driven inwardly to contact the wellhead component 14 to be actuated, the flat contact surface 32 of the nose of the screw will engage in sliding contact with the cooperating camming surface 17a. Since the contact nose does not rotate against the cooperating camming surface 17a of the wellhead component and engages over a large contact area, contact stresses are reduced and susceptibility to galling is minimized. The shank 23 includes an externally threaded section 23a adjacent its outer end which receives a packing nut 25. The packing nut 25 is externally threaded whereby it may be threaded into the bore 11 provided in a wellhead structure 12 and used to energize a packing assembly sleeved about the shank 23 by compressing the assembly against a shoulder provided in the bore 11.

3 Claims, 4 Drawing Figures

HOLDDOWN SCREW

BACKGROUND OF THE INVENTION

This invention relates generally to actuating screws and more particularly to a holddown lock screw as is commonly used in pressurized wellhead structures for such functions as holding down a casing or tubing hanger mounted in the wellhead or for energizing a pack-off seal or any of a variety of wellhead seal devices.

In a typical wellhead structure, one or more concentrically disposed casing strings are suspended from casing hangers which are supported within the bore of a casing head member. A hanger bowl lowered into the wellhead provides support for a tubing hanger which receives one or more tubing strings extending down into the well within the innermost casing string.

The casing hangers and tubing hanger are normally held down by a plurality of holddown screws which are threaded into the wellhead and against camming surfaces of the hangers in order to urge these components downwardly. The screws are customarily arranged in equiangular spacing in co-planar dispostion about the wellhead and are adapted to be moved axially in a radial direction of the longitudinal axis of the wellhead. The holddown screws thus act to prevent the blowout of these wellhead components. In many other applications holddown screws are used to provide a preload for energizing pack-offs or other wellhead seal devices. Typically, the nose end of each of the screws engages a camming surface of the seal device or pack-off to apply an energizing force in either the upward or downward direction depending upon the particular type of seal or pack-off device. The nose end of the holddown screw is customarily of conical configuration and is adapted to engage a frusto-conical surface of the component to be held down or engergized. The shank and nose of the holddown screw are conventionally a single piece. Rotation of the screw which drives it inwardly against the matting surface of the wellhead component causes the conical nose of the screw to rotate thereagainst and the associated large stresses at their line of contact makes either of the contacting surfaces very susceptible to galling.

It is therefore a primary object of the invention to provide a holddown screw design which will minimize or reduce the susceptibility to galling of the holddown screw or the surface of the object to be actuated.

Another object of the invention is to provide a holddown screw, the functioning of which is associated with lesser contact stresses between the screw and the actuated object than has heretofore been the case.

A further object is to provide a holddown screw suitable for wellhead applications wherein the screw is provided with a contact nose which will not rotate against the mating camming surface of the object to actuated or energized.

SUMMARY OF THE INVENTION

The invention is a holddown screw which features a shank and contact nose of separate two piece construction. The contact nose of the holddown screw is provided with a flat bevelled contact surface of predetermined angle to the axis of the screw selected to correspond to the angle of the camming surface with which it is designed to cooperate. The contact nose is carried on the shank of the holddown screw and is adapted for relative rotation thereon as the screw is rotated. The back end of the contact nose is provided with a relatively large flat annular surface disposed radially to the longitudinal axis of the screw and which is adapted to engage a large annular shoulder of the shank of the screw in flat co-planar relationship therewith. As the screw is rotated to be driven axially inwardly to contact the wellhead component to be actuated, the flat contact surface of the nose of the screw will engage in sliding contact with the cooperating camming surface over a larger contact area than that which is typical of holddown screws with conical contact surfaces. Since the contact nose does not rotate against the cooperating camming surface of the wellhead component and engages over a larger contact area, the contact stresses are much less than with conventional conical tip holddown screws and susceptibility to galling is minimized. Although the back end of the contact nose rotates against the annular shoulder of the shank of the screw during the actuation of the wellhead component, the contact area is relatively large and galling is not a problem.

BRIEF DESCRIPTION OF THE DRAWINGS

In the accompanying drawings which form part of the specification and are to be read in conjunction therewith.

Figure 1:
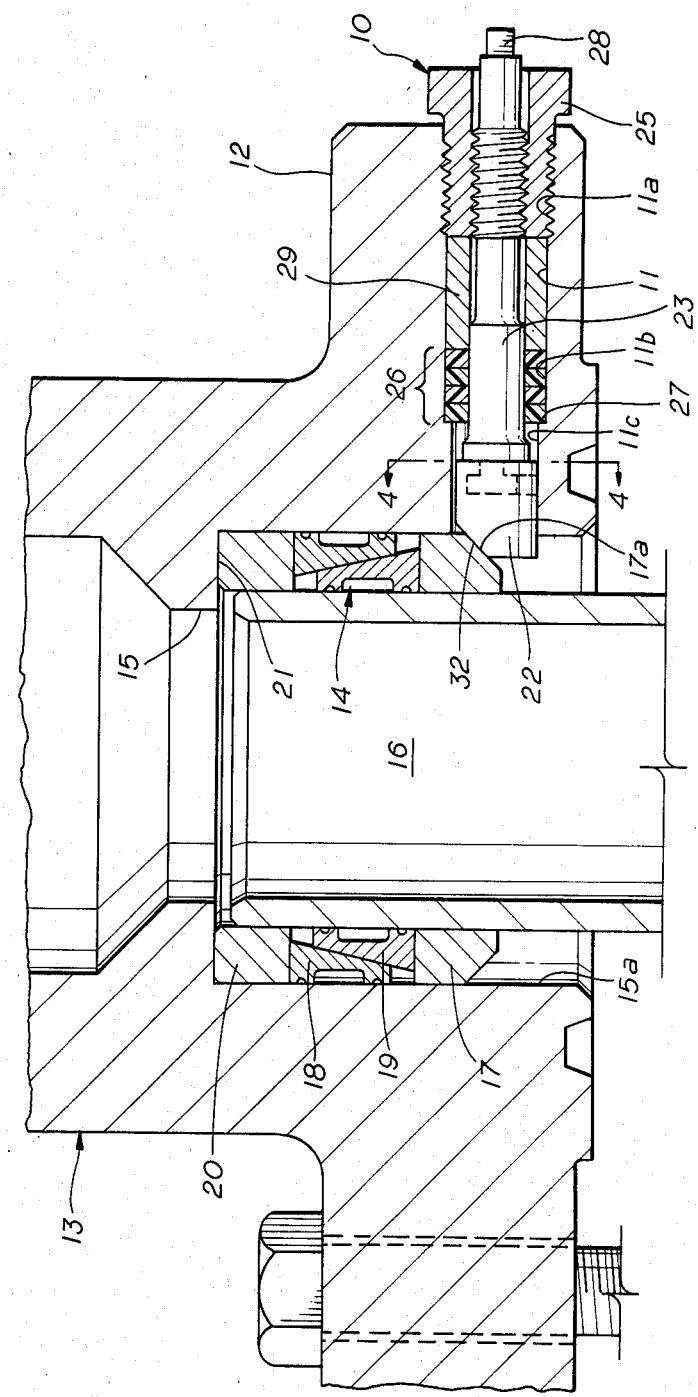
FIG. 1 is a vertical sectional view of the lower end of a casing spool in a wellhead structure showing the holddown screw of this invention in a typical application of providing an energizing force for a crossover seal disposed in an axial bore of the casing spool and in surrounding relation to a concentric casing segment for sealing therebetween.

Referring to the drawings in greater detail, there is shown in FIG. 1 a preferred embodiment of the holddown screw 10 of this invention wherein the screw 10 is threaded into a radial bore 11 provided in the lower flange 12 of a casing spool 13 for energizing a crossover seal assembly 14. The casing spool 13 which seats atop a casing head (not shown) and is bolted thereon is provided with an axial bore 15 extending therethrough and having an enlarged counterbore section 15a at its lower end. The counterbore 15a receives the upper end of a segment of casing 16 and the crossover seal assembly 14 is disposed in the counterbore 15a in surrounding relation to the casing 16 for sealing the annulus between the facing and the cylindrical wall which defines this counterbore 15a. As is well known, the purpose of the crossover seal is to isolate the high pressure fluids within the casing or tubing head from the higher pressure fluids within the casing string.

In the application illustrated in FIG. 1 the contact nose 22 of the holddown screw 10 engages the energizer ring 17 which is the lower member of the seal assembly 14 and urges it upward to apply an axial preload force to the seal assembly 14. For practicality, it is well known in the art, that a plurality of holddown screws are used to engergize a pack-off or seal assembly. Conventionally, the holddown screws are oriented in equiangular spacing about the circumference of the casing spool flange and each is adopted to contact the energizer ring 17 in the manner shown in FIG. 1.

Since the spacer ring 20 which is the upper member of the seal assembly 14 is restricted in upward movement by the annular shoulder 21 defined by the counterbore 15a, the metal seal rings 18, 19 of the seal assembly 14 as urged by the holddown-screws and energizer ring 17 are tightly wedged into metal-to-metal sealing relationship with each other as well as the outer wall of casing 16 and the cylindrical wall of the counterbore 15a. A more detailed description of the crossover seal assembly 14 is provided in U.S. Pat. No. 4,556,224.

With conventional holddown screws which are characterized by conical tips, very large contact stresses are created at their line of contact with the camming surface of the object to be actuated. These stresses are aggravated by the rotational movement of the conical tip on the camming surface as the holddown screw is driven axially thereagainst and galling is a very common result. The holddown screw 10 of this invention is designed to reduce susceptibility to galling.

To prevent leakage of well fluids, through the opening in the flange 12 provided by the radial bore 11, a packing gland nut 25 is threaded into the flange bore 11 around the shank of the screw 10 to activate a set of packing rings 26 which are compressed between the packing gland nut and an annular radial shoulder 27 formed in the bore 11 to form a seal between the screw 10 and the wall of the bore 11.

Figure 2:
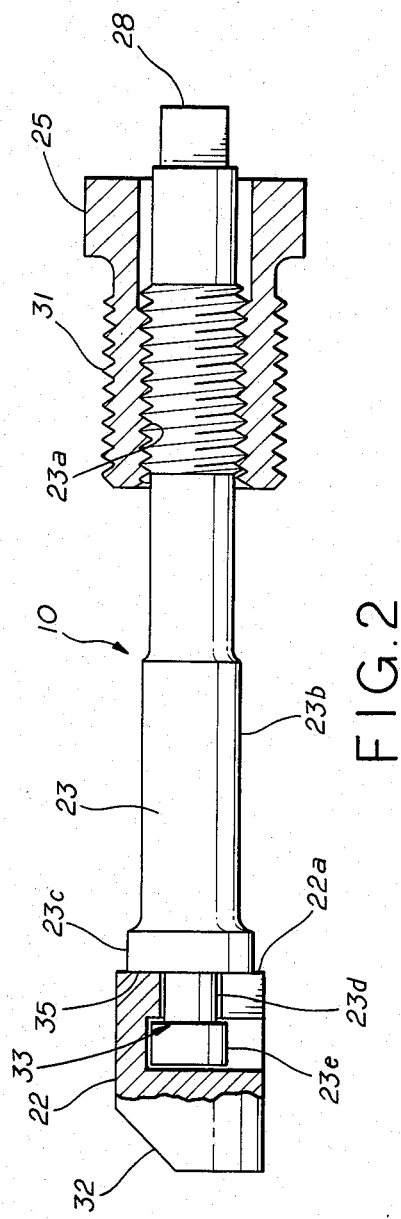
FIG. 2 is an enlarged view of the holddown screw of the invention with parts thereof in section, to show details of construction.
Figure 3:
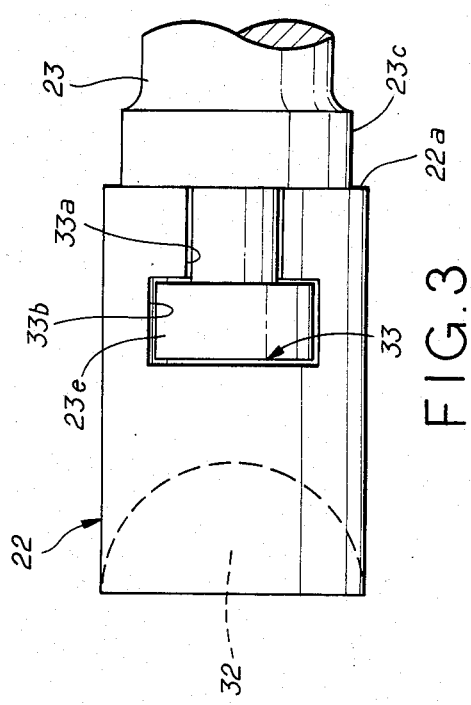
FIG. 3 is a fragmentary view of the contact nose portion of the holddown screw of FIG. 2, showing the contact nose as it appears rotated 90 degrees from the position shown in FIG. 2.
Figure 4:
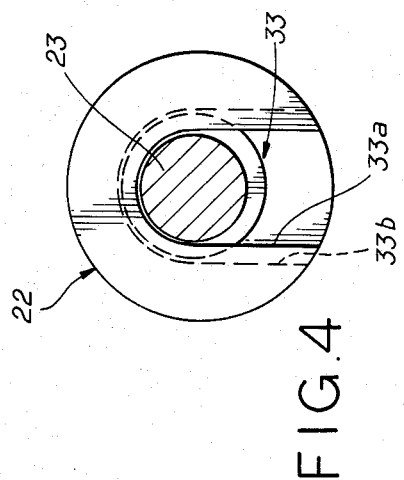
FIG. 4 is a sectional view, taken along the line 4—4 in FIG. 1.

The detailed construction of the holddown screw is shown in FIGS. 2, 3 and 4. As will be seen therein, the holddown screw 10 is provided with an elongate shaft or shank portion 23 having at the outer end 28 of the screw, a hexagonal or rectangular cross section suitable for turning by a wrench. A section 23a of the shank 23 is threaded to receive the packing nut 25 which is provided with internal threads in a section of its axial bore to engage therewith. The packing nut is also formed with external threads 31 adapted for engagement with the threaded section 11a of the bore 11. The intermediate diameter section 11b of the radial bore 11 receives the set of packing rings 26 and a metal packing retainer ring 29 which are sleeved over a smooth section 23b of the shank 23 with the retainer ring 29 interposed between the packing nut and the packing rings. By threading the packing nut 25 into the bore 11, the packing rings 26 are compressed against the annular shoulder 27 in bore 11 which is formed by the junction of reduced diameter section 11c of the bore 11 with intermediate diameter section 11b. The packing rings may be of any conventional type as are used to effect a seal. Typically they are of elastomer or graphite material, depending upon the particular application and when compressed undergo radial expansion to effect seals with the wall of the cylinder in which they are enclosed and the exterior of the shaft over which they are sleeved.

The end portion of the shaft 23 which is adapted to carry the separate contact nose 22 thereon is provided with a circumferential annular groove which defines a reduced diameter section 23d of the shaft 23 intermediate a larger diameter radial flange 23e at the distal end of the shaft and a still larger diameter radial flange 23c on the shaft 23.

The contact nose 22 is of cylindrical exterior configuration but provided with a flat bevelled surface 32 at a selected angle to its longitudinal axis. Preferably, the bevelled surface extends from a diameter of the cylindrical contact nose as seen in radial cross section. The contact nose 22 is also provided with a slot or recess 33 which extends from the end 22a of the contact nose 22 remote from the distal end to substantially half the length of the contact nose.

In a sectional view along the longitudinal axis of the contact nose, the recess includes a narrow portion 33a of width sufficient to accommodate the reduced diameter section 23d of shaft 23 and a larger wider portion 33b which is provided with a dimension in the direction of the longitudinal axis of the contact nose which is slightly larger than the axial dimension of the flange 23e on the distal end of shaft 23. Accordingly the slot portion 33b is able to receive the flange 23e therein and the slightly larger axial dimension of the slot permits a limited axial movement of the contact nose on the shaft 23.

The recess 33 also opens at the cylindrical side surface of the nose 22 and extends inwardly therefrom a depth sufficient to accommodate the flange 23e and shaft section 23d in coaxial alignment therewith.

To install the holddown screw, the screw is assembled with packing rings 26, retainer ring 29, and packing nut 25 sleeved on the shaft 23 as appears in FIG. 1. The screw is then inserted nose first into the flange bore 11 and packing nut 25 threaded into the bore 11 a distance sufficient to compress the packing ring set and effect a seal therewith. Since typically a plurality of holddown screws are employed, each is installed in similar manner. The shafts 23 of each of the screws 10 are then advanced inwardly towards the interior of the well bore by rotating the outer end 28 of each shaft 23 until the bevelled surface 32 of the contact nose of the screw engages a camming surface on the object to be actuated, such as the frusto-conical surface 17a of the energizer ring 17 of the crossover seal assembly of FIG. 1. The screws 10 are advanced further inwardly until a predetermined preload is applied. Since the bevelled surface 32 of the contact nose is a planar surface a greater contact area will be established with the cooperating camming surface as greater force is applied and contact stresses are less than would be obtained with a conical tip on the contact nose. The contact stress can then be reduced and controlled to remain below the stress threshold as would induce galling of the mating surfaces. It is of course, possible to shape the two cooperating camming surfaces to identical configurations, however, the results and benefits obtained are insignificantly better than those obtained with a planar bevelled surface on the contact nose.

It is to be noted that upon initial contact of the contact nose 22 with the camming surface, such as 17a, the contact nose 22 will not rotate although the shaft 23 is advanced inwardly by axial rotation of the shaft 23 as induced by a tool applied to the outer end 28 of the shaft 23. There is therefore no relative rotation between the contact nose 22 and the camming surface 17a but only sliding contact therebetween as the preload is applied. There will, of course, be relative rotation between the contact nose 22 and the shaft 23 with the planar generally U-shaped surface at the blunt end 22a of the contact nose rotating against the annular planar surface of the flange shoulder 35 which is formed by the groove in the surface of shaft 23 which defines the reduced diameter section 23d and the face of the flange 23c.

Since the area of contact between the two planar surfaces 22a and 35 is relatively large there is little likelihood of binding or galling of these surfaces even though there is sliding and rotational contact.

It will therefore be seen that the holddown lock screw of this invention provided with a separate contact nose which will not rotate against the mating camming surface of the object to be actuated or energized will greatly reduce the likelihood of galling between the two surfaces and the harmful effects resulting therefrom, such as welding of the surfaces.

It is also to be understood that the foregoing description of a preferred embodiment of the invention has been presented for purposes of illustration and description and is not intended to limit the invention to the precise form disclosed. For example, the particular nature of the packing assembly which is sleeved about the shaft 23 of the screw 10 is not critical as a great variety of packing assemblies might be suitably employed. The holddown screw 10 might be used in a variety of applications other than as herein illustrated such as for holding down a casing or tubing hanger or energizing a pack-off. The mounting of the contact nose on the shaft 23 may also be other than shown so long as it is relatively axially rotatable with respect to the shaft 23 and will not rotate against the mating camming surface of the object which is to be actuated or energized. Also, the contact nose might be provided with two bevelled surfaces should it be desirable to have the capability of spreading a pair of camming surfaces as in the event a pair of sealing assemblies are located below the contact nose. It is to be appreciated therefore, that changes may be made by those skilled in the art without departing from the spirit of the invention.

What is claimed is:

1. A holddown screw adapted for use in a wellhead structure such as a casing head or tubing head having a radial bore extending from the exterior of the wellhead to the interior thereof and a counterbore extending from the outer end of the radial bore to an annular counterbore shoulder at the inner end thereof and wherein said counterbore comprises a smooth bore section extending from the annular shoulder to a threaded section in the outer end portion thereof, said holddown screw comprising:

an elongate shank having an externally threaded section adjacent the outer end thereof and an annular bearing shoulder adjacent the inner end thereof and facing towards said inner end;

an internally threaded packing nut threaded onto the threaded section of the shank and being provided with external threads whereby the packing nut is adapted to be threaded into the threaded section of said counterbore to engergize a packing ring assembly when the packing rings are disposed in sleeved relation about said elongate shank by compressing the packing ring assembly against said counterbore shoulder;

a contact nose element having a bearing surface at one end and a bevelled planar camming surface at the other end thereof;

means for mounting said contact nose element on the inner end portion of the shank for limited axial movement and relative rotary movement on said shank with the bearing surface of the contact nose disposed towards said annular bearing shoulder of the shank and adapted to bear against said bearing shoulder of the shank at one limit of its axial movement thereon as the shank is advanced toward the interior of the wellhead structure by axial rotation of the shank within the packing nut;

and means on the outer end portion of said shank for accommodating a force for effecting its axial rotation whereby the shank of the holddown screw may be advanced axially inward to drive the contact nose into engagement with a device to be actuated within said wellhead with the camming surface of the contact nose disposed in sliding non-rotating engagement with a cooperating camming surface of said wellhead device.

2. A holddown screw as recited in claim 1 further including an annular packing assembly sleeved about said shank in abutting engagement with said packing nut on the side thereof which faces the contact nose.

3. A holddown screw as recited in claim 1 wherein said bearing surface at one end of the contact nose is a planar surface disposed radially to its longitudinal axis and its camming surface is a bevelled planar surface at an acute angle thereto.

* * * * *